W. A. CAMPBELL.
VALVE FOR TIRES.
APPLICATION FILED NOV. 16, 1914.
1,170,412.
Patented Feb. 1, 1916.
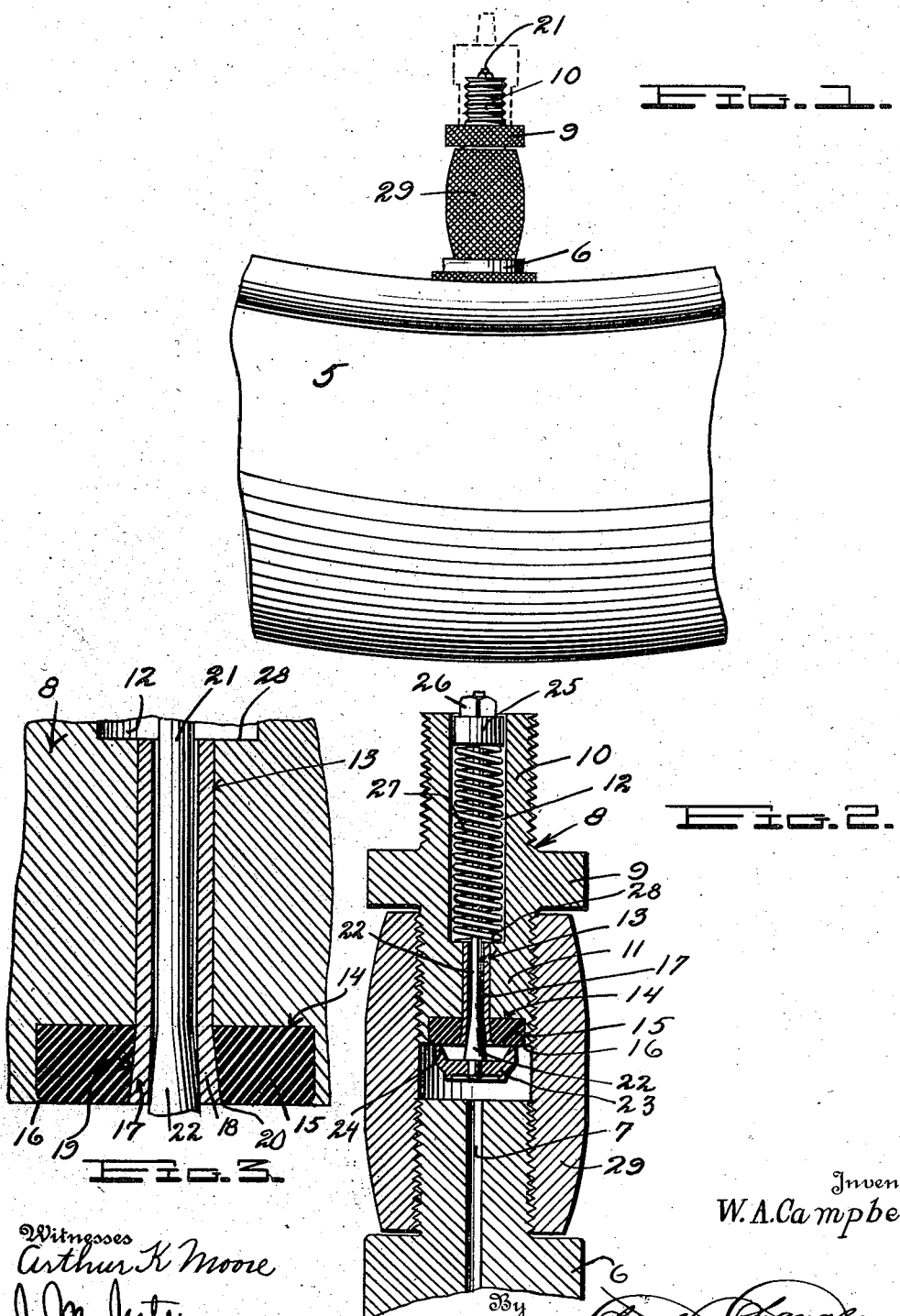

UNITED STATES PATENT OFFICE.

WILLIAM A. CAMPBELL, OF MARICOPA, CALIFORNIA.

VALVE FOR TIRES.

1,170,412. Specification of Letters Patent. Patented Feb. 1, 1916.

Application filed November 16, 1914. Serial No. 872,446.

*To all whom it may concern:*

Be it known that I, WILLIAM A. CAMPBELL, a citizen of the United States, residing at Maricopa, in the county of Kern, State of California, have invented certain new and useful Improvements in Valves for Tires; and I do hereby declare the following to be a full, clear, and exact description of the invention, such as will enable others skilled in the art to which it appertains to make and use the same.

This invention relates to valves, particularly to that type for use on pneumatic tires, and has for its object the provision of a simple and novel tire valve which may be readily inserted and removed and which may be quickly and easily assembled or taken apart for repairing.

An important object is the provision of a valve of this character which may be removed without twisting the stem and in which the rubber washer may be readily replaced when worn.

Another object is the provision of a valve of this character simple and inexpensive in manufacture, efficient and durable in use and a general improvement of the art.

With these and other objects and advantages in view, the invention consists in the novel construction and arrangement of parts to be hereinafter more fully described and claimed and illustrated in the accompanying drawing, in which—

Figure 1 is an elevation of my valve applied to a tire, Fig. 2 is an enlarged vertical sectional view therethrough, and Fig. 3 is an enlarged detail fragmentary section.

Referring more particularly to the drawing the numeral 5 designates a tire having the usual stem 6 extending therefrom to which my device is adapted to be applied. The stem 6 is provided with the usual passage 7 and externally screw threaded as shown.

My novel valve comprises a body portion 8 having an annular knurled or milled extension 9 thereon to form a grip. Adjacent each side of the extension 9 are reduced portions 10 and 11 which are externally screw threaded as shown. A bore 12 extends axially through the major portion of the body portion 8 and communicates with a smaller bore 13 which extends to the end of the reduced portion 11. The lower end of the portion 11 is further provided with a circular recess 14 within which is disposed a rubber disk 15 which is held in place by bending over the metal at the edge as shown at 16. Disposed within the bore 13 is a sleeve 17 which is flared outwardly at its lower ends as shown at 18, the flared portion extending through a hole 19 in the disk 15, the extreme outer end of the flared portion being bent over as shown at 20 to assist in holding the disk 15 in place.

Extending through the bore 12 and through the sleeve 17 is a valve rod 21 which is provided at its end with a tapered portion 22 fitting loosely within the opening in the flared portion 18 of the sleeve. Secured upon the end of the tapered portion 22 is a concave ring 23 which has its outer edge 24 normally seating upon the disk 15 and consequently making an air-tight joint. The other end of the rod 21 is screw threaded as shown and carries a guide plate 25 which is prevented from displacement by a lock nut 26. A coil spring 27 surrounds the rod 21 and is disposed within the bore 12, the spring abutting against the shoulder 28 at the junction of the two bores and also abutting against the guide plate 25.

My novel valve is attached to the stem 6 by means of a coupling 29 which is interally screw threaded and which engages the screw threaded portions of the stem 6 and the extension 11.

In the use of my device it will be seen that normally the ring 23 will bear firmly against the disk 15 and prevent the escape of air from the tire. When it is desired to inflate the tire, the pump attaching nipple is screwed upon the extension 10 in the usual manner, whereupon the air from the pump will pass through the bore 12, through the sleeve 17 and against the ring 23, forcing the ring from its seat and allowing air to pass into the tire.

From the foregoing description and a study of the drawing it will be apparent that I have thus provided a simple and novel valve which may be quickly and easily used on or removed from a tire and which may be readily taken apart for cleaning or repairs. It is to be observed that air passing into or out of the valve does not pass through the rubber disk. This feature is important as it lengthens the life of the rubber disk. When air is admitted into the tire and the ring 23 displaced, it will quickly reseat itself and prevent the escape of any air. If it is desired to put in a new rubber disk, the valve may be readily removed from the coupling 29, after which the nut 26 and guide plate 25 may be removed whereupon the valve rod may be pulled out and a new rubber disk inserted.

It will be readily understood that I reserve the right to make various changes in the form, construction and arrangement of parts without departing from the spirit of the invention or limiting the scope of the subjoined claim.

Having thus described my invention, I claim:

In combination with the threaded nipple of a tire, a valve comprising a body portion having its ends formed reduced and externally threaded, said body portion being provided with a comparatively large bore extending through its major portion and a smaller bore communicating therewith, a rubber disk recessed into the end of the inner reduced portion, a sleeve extending through said smaller bore and having an outwardly flared end, a valve rod extending through said large bore and said sleeve, a guide collar threaded upon one end of said rod, a cupped disk secured upon the other end of said rod and normally seating against said rubber disk, the portion of said rod adjacent said cupped disk being tapered to conform to the flared end of said sleeve, a coil spring surrounding said rod and abutting against the end of said larger bore and said guide collar, and a coupling ring threaded upon the inner reduced extension and said nipple.

In testimony whereof, I affix my signature in the presence of two witnesses.

WILLIAM A. CAMPBELL.

Witnesses:
  E. L. TIFFANY,
  WM. LUCAS.